United States Patent
Kolar et al.

(10) Patent No.: US 10,285,108 B1
(45) Date of Patent: May 7, 2019

(54) PROACTIVE ROAMING HANDSHAKES BASED ON MOBILITY GRAPHS

(71) Applicant: Cisco Technology, Inc., San Jose, CA (US)

(72) Inventors: Vinay Kumar Kolar, San Jose, CA (US); Jean-Philippe Vasseur, Saint Martin d'uriage (FR); Santosh Pandey, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/782,197

(22) Filed: Oct. 12, 2017

(51) Int. Cl.
| | | |
|---|---|---|
| *H04W 24/08* | (2009.01) | |
| *H04W 36/32* | (2009.01) | |
| *G06N 99/00* | (2019.01) | |
| *H04W 36/00* | (2009.01) | |

(52) U.S. Cl.
CPC .......... *H04W 36/32* (2013.01); *G06N 99/005* (2013.01); *H04W 36/0016* (2013.01); *H04W 36/0083* (2013.01)

(58) Field of Classification Search
CPC ............. H04W 36/32; H04W 36/0016; H04W 36/0083; G06N 99/005
See application file for complete search history.

(56) References Cited

U.S. PATENT DOCUMENTS

| | | | |
|---|---|---|---|
| 7,275,157 B2 | 9/2007 | Cam Winget | |
| 7,421,268 B2 | 9/2008 | Lee et al. | |
| 7,844,057 B2 | 11/2010 | Meier et al. | |
| 8,018,900 B2 | 9/2011 | Blanchette et al. | |
| 2009/0238193 A1* | 9/2009 | Nishida .................... | H04W 8/08 370/401 |
| 2012/0190326 A1* | 7/2012 | Mizusawa ........... | H04L 12/1421 455/406 |
| 2013/0308470 A1* | 11/2013 | Bevan .................... | H04W 64/00 370/252 |
| 2018/0014159 A1* | 1/2018 | Folco .................... | H04W 4/029 |

OTHER PUBLICATIONS

Dutta, et al., "Seamless proactive handover across heterogeneous access networks", Wireless Pers Commun, 19 pages, 2007, Springer Science+Business Media.

* cited by examiner

*Primary Examiner* — Pakee Fang
(74) *Attorney, Agent, or Firm* — Behmke Innovation Group LLC; James Behmke; Stephen D. LeBarron

(57) ABSTRACT

In one embodiment, a service maintains a mobility path graph that represents roaming transitions between wireless access points in a network by one or more client devices in the network. The service identifies, using the mobility path graph, one of the wireless access points in the network to which a particular client device is predicted to roam. The service performs, in advance of the particular client device initiating roaming to the one or more wireless access points, one or more roaming handshakes on behalf of the particular client device and with respect to the wireless access point to which the particular client device is predicted to roam. The service sends handshake data from the performed one or more roaming handshakes to the identified access point to which the particular client device is predicted to roam.

18 Claims, 13 Drawing Sheets

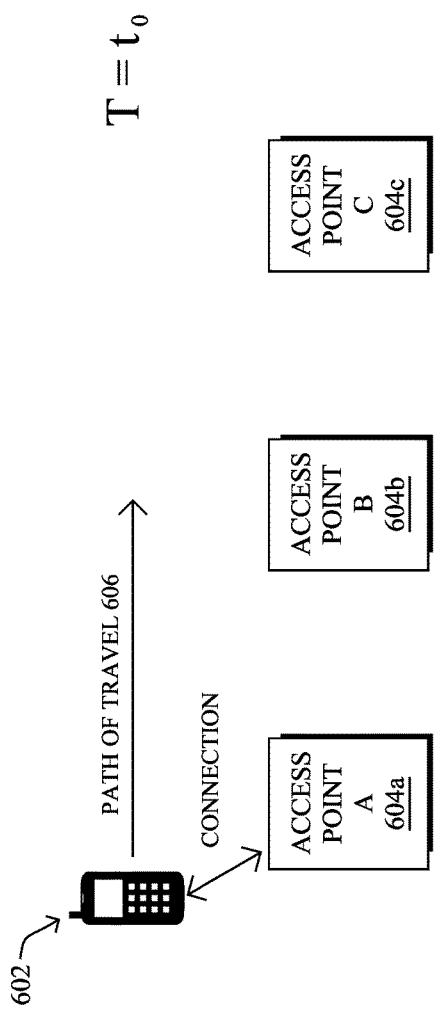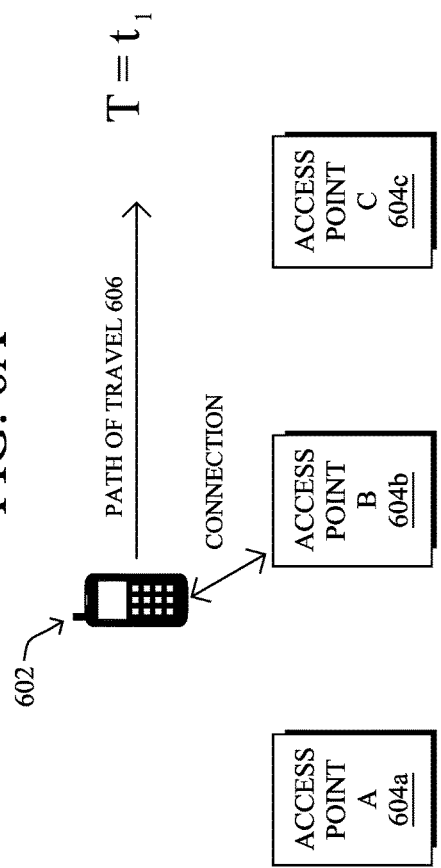

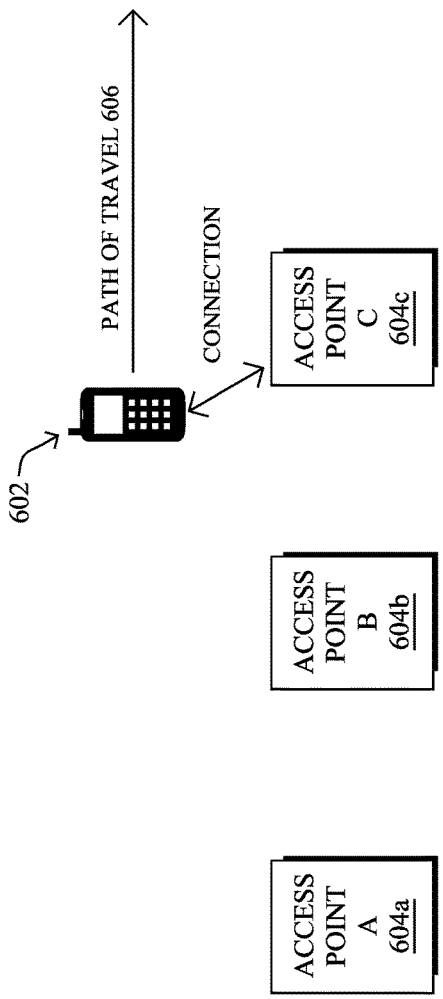
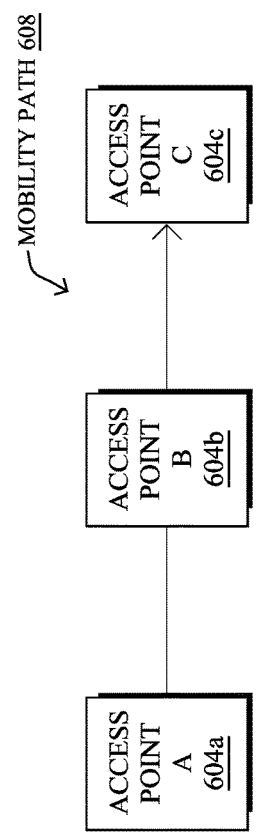
FIG. 6C
FIG. 6D

US 10,285,108 B1

PROACTIVE ROAMING HANDSHAKES BASED ON MOBILITY GRAPHS

TECHNICAL FIELD

The present disclosure relates generally to computer networks, and, more particularly, proactive roaming handshakes in wireless networks based on mobility graphs.

BACKGROUND

In most wireless networks, such as Wi-Fi networks, roaming is a fairly common event. Generally, roaming refers to a client device transitioning from one wireless access point (AP) to another. Notably, roaming is often caused by the client device attempting to connect to the "best" AP available in the location of the client. The "best" AP from the standpoint of the client device may change over time due to movement of the client, changes in the environment that affect the signal (e.g., in terms of strength, signal to noise ratio, etc.), or other such factors.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6E illustrate examples of mobility paths in a network;

DESCRIPTION OF EXAMPLE EMBODIMENTS

Overview

Figure 1A:
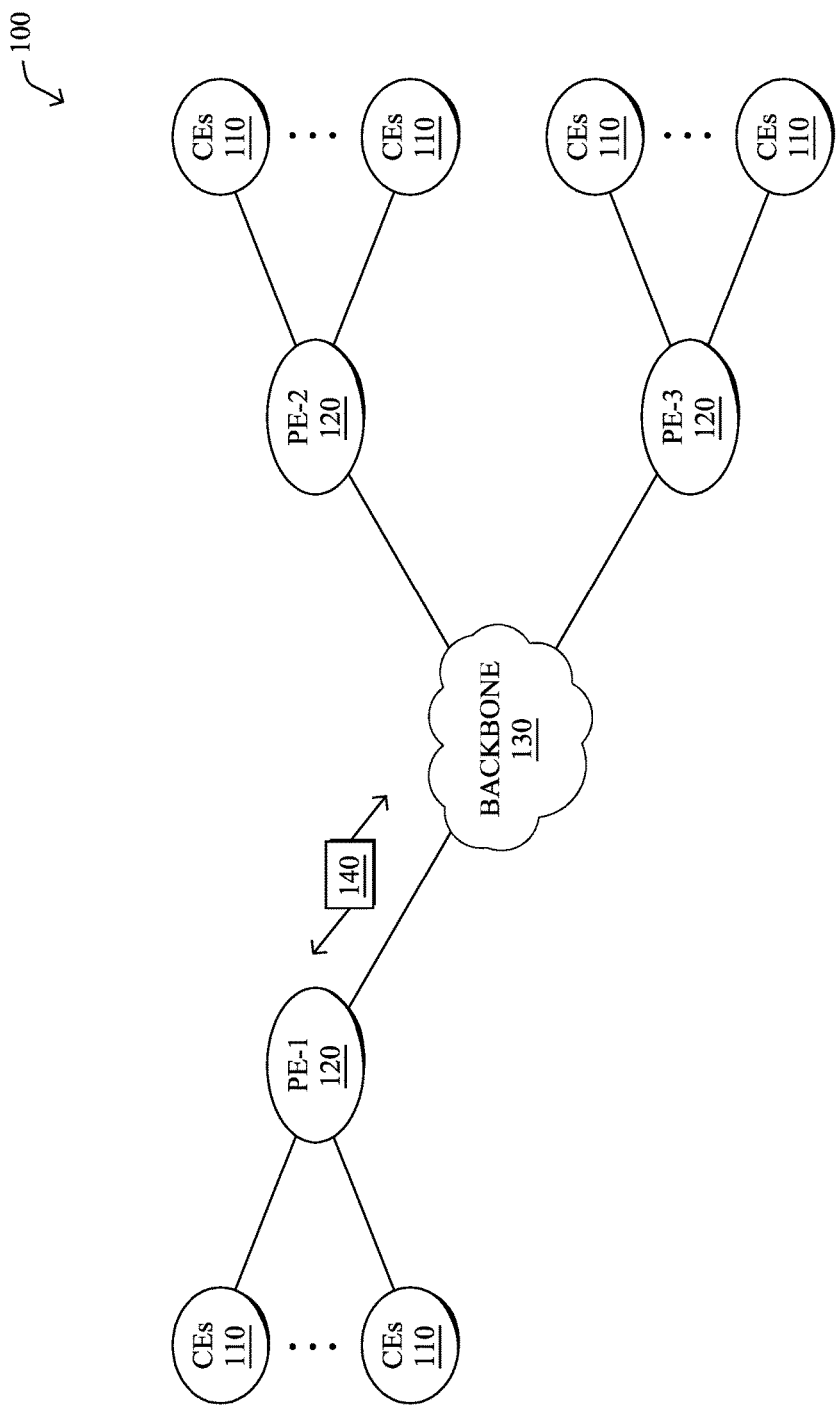
FIGS. 1A-1B illustrate an example communication network.

According to one or more embodiments of the disclosure, a service maintains a mobility path graph that represents roaming transitions between wireless access points in a network by one or more client devices in the network. The service identifies, using the mobility path graph, one of the wireless access points in the network to which a particular client device is predicted to roam. The service performs, in advance of the particular client device initiating roaming to the one or more wireless access points, one or more roaming handshakes on behalf of the particular client device and with respect to the wireless access point to which the particular client device is predicted to roam. The service sends handshake data from the performed one or more roaming handshakes to the identified access point to which the particular client device is predicted to roam.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
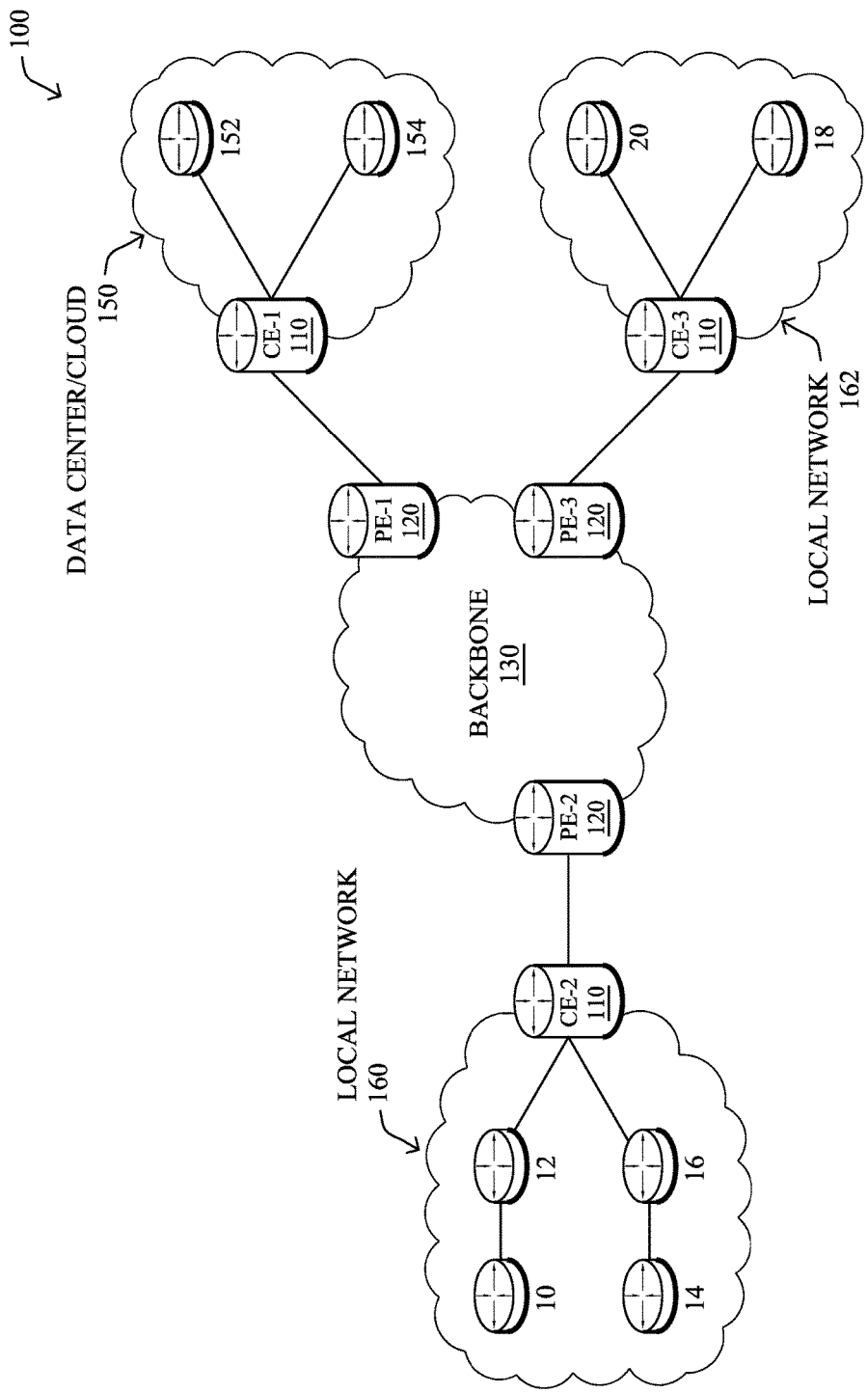

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
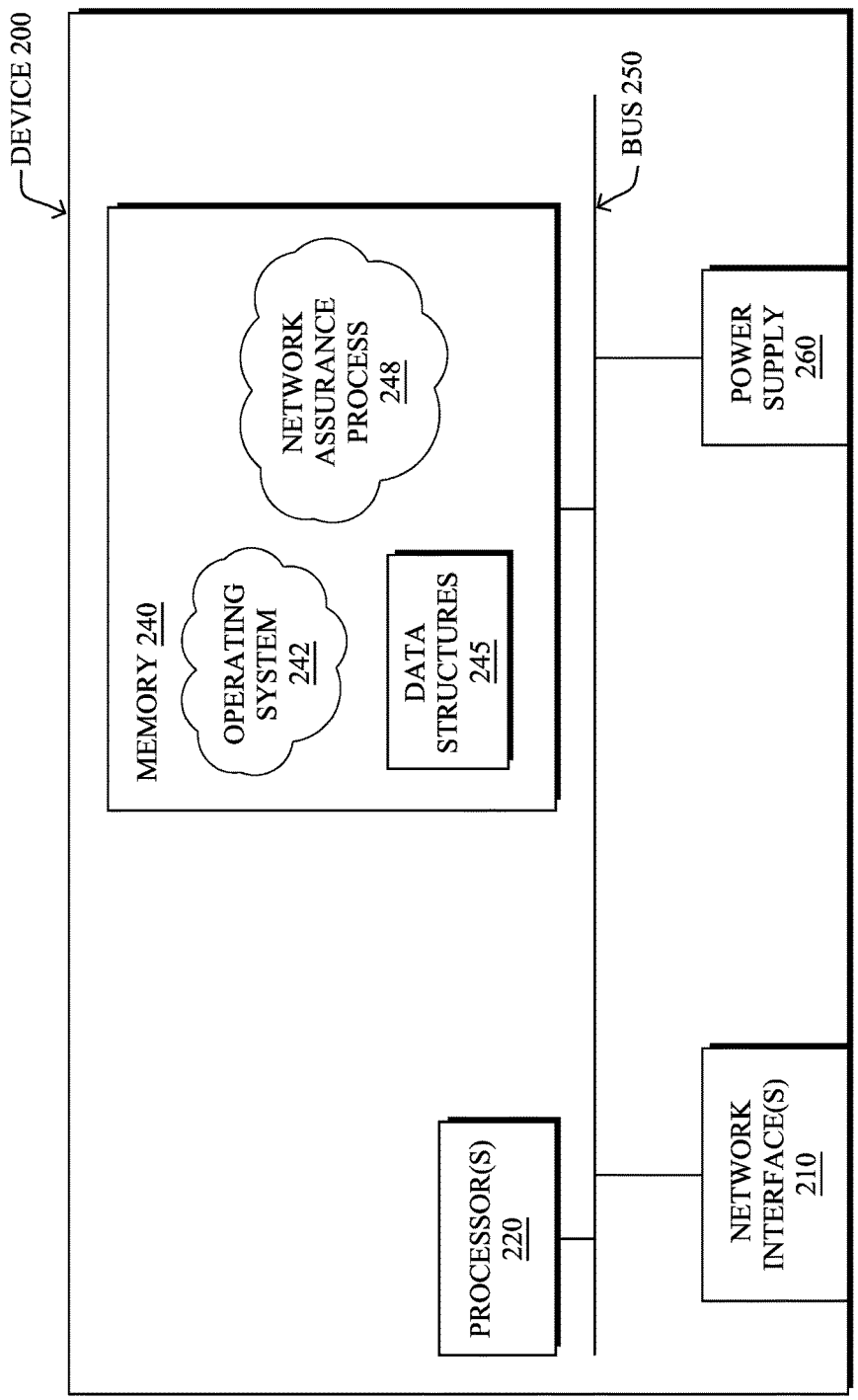
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
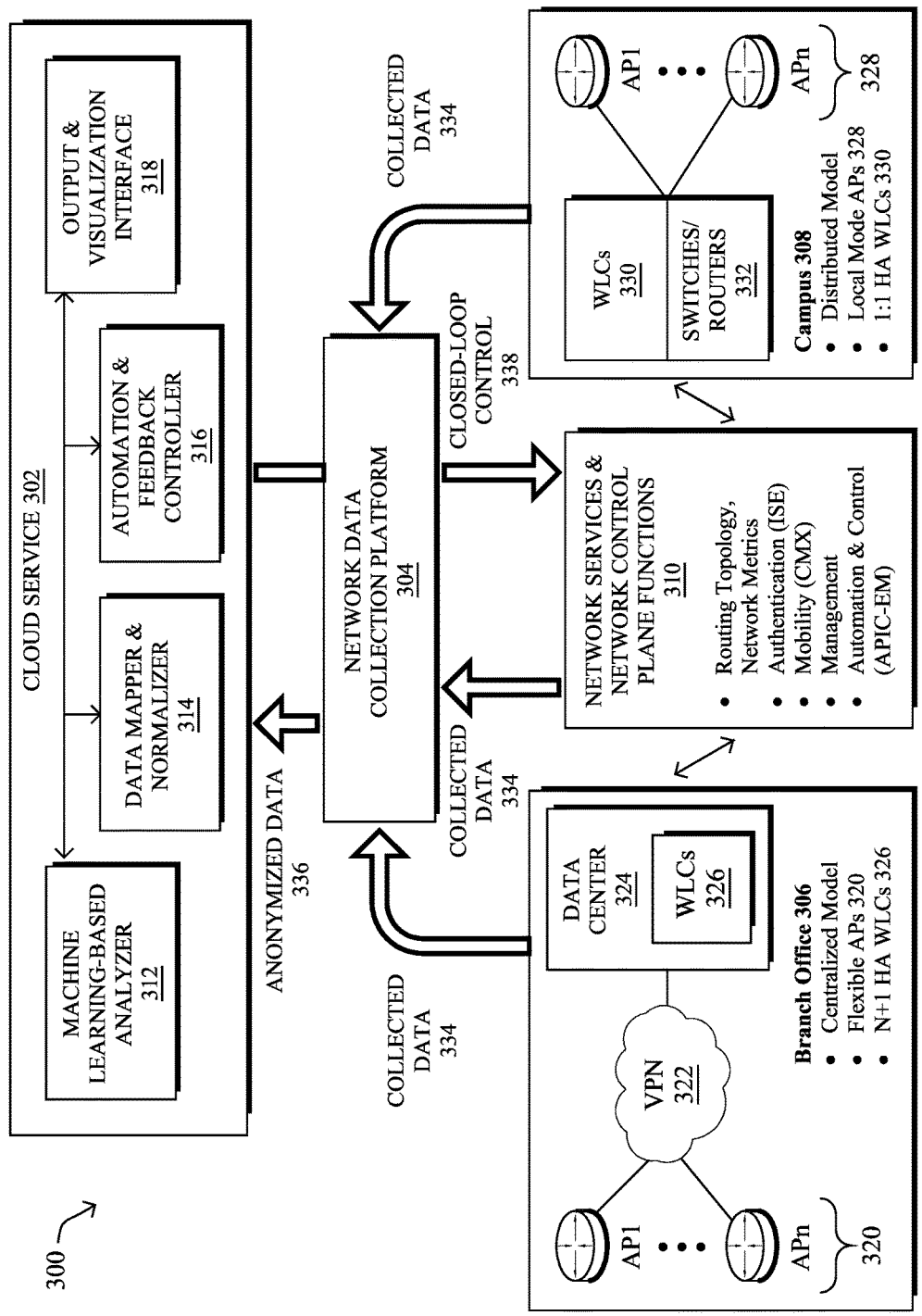
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP) v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, in a wireless network, such as a Wi-Fi network, when a client moves from one Access Point (AP) to another, roaming events are triggered. These roaming events are potentially costly in terms of control plane operations and are also prone to failure, with roaming failure rates of 20% or more being common in many networks. Based on the APs involved in the roaming, the type of roaming may be classified as being Layer-2 roaming, Layer-3 roaming, intra-WLC roaming, etc. The handshake and the amount of time required for the roaming operation generally depends on the type of roaming involved.

Figure 4:
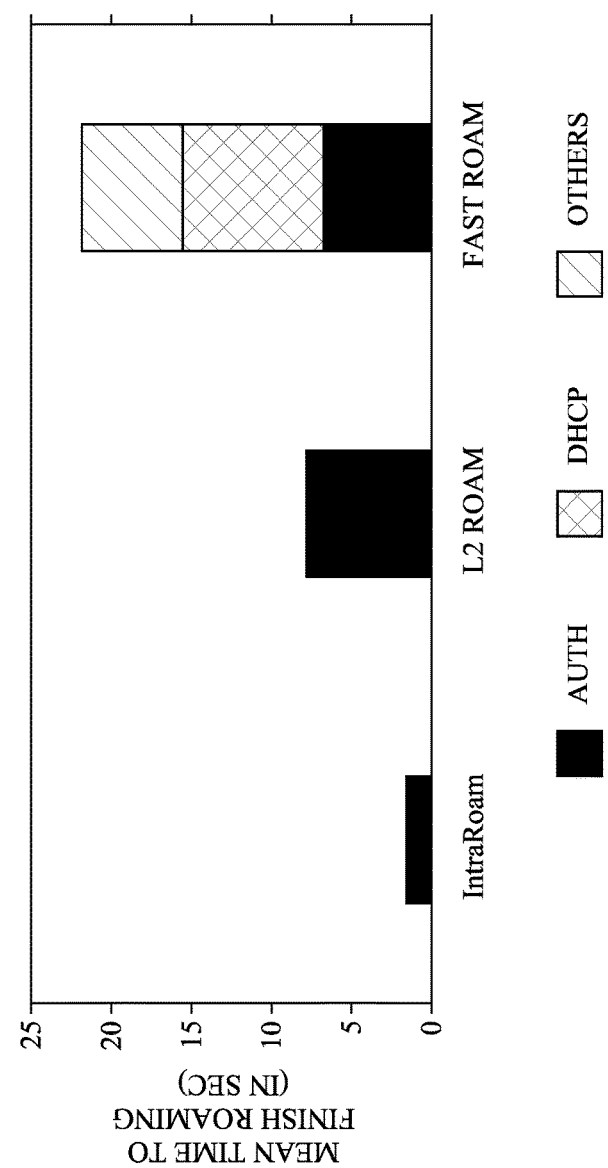
FIG. 4 illustrates a plot of example roaming handshake delays.

FIG. 4 illustrates a plot 400 of example roaming handshake delays. Typically, successful roaming handshakes take anywhere between a few seconds to tens of seconds to complete. As shown, this time can vary greatly, depending on the type of roaming involved. For example, intra-WLC roaming (denoted IntraRoam) is a relatively quick operation, as the roaming occurs between two APs connected to the same WLC. In such a case, only authentication is needed to complete the handshake. Layer-2 (L2) roaming is a somewhat slower operation and entails the client roaming between APs on the same client subnet and requiring only authentication during the handshake. Finally, Fast Roaming events (e.g., Layer 3 roaming) may entail a handshake that has authentication, DHCP, and other steps, leading to a much longer handshake delay than that of the other roaming types.

More specifically, during a roaming event in which a client device moves from wireless AP to another (e.g., between Wi-Fi APs, etc.), roaming handshakes may be performed for any or all of the following reasons:

Association—to associate the client with a particular AP.
Authentication—to authenticate the client and its access to the wireless network.

Mobility—to indicate when the client moves from one WLC to another.

DHCP—to configure the client, such as with a particular IP address.

Non-elastic applications, such as voice and video calls, suffer heavily when the client device is roaming, leading to unacceptable disruptions. Thus, the roaming delays experienced by the user are strongly dependent on the amount of time needed to complete the roaming handshakes.

Proactive Roaming Handshakes Based on Mobility Graphs

The techniques introduced herein allow for proactive roaming handshakes to be made using mobility graphs, thereby allowing for faster client roaming in a wireless network. In some aspects, the techniques herein introduce the concept of computing roaming delays over client/user paths, which provides information about the degradation of user experience at different locations due to the delay in link setup times while roaming. In another aspect, the techniques herein also introduce a proactive engine that uses the roaming delay information and user mobility pattern to proactively keep the roaming related information ready when the user moves the client to a new area. This proactive engine, in some embodiments, may leverage machine learning, to predict when handshakes should occur, based on mobility predictions for the client device. In a further aspect, the techniques herein proactively initiate local reroutes or AP association changes if the system predicts that the user will have roaming failures. In other words, such a proactive scheme will predict the possible failure and mitigate failures before they occur. As would be appreciated, while the techniques herein are described primarily with respect to Wi-Fi networks, the techniques are not limited as such and could be used in the broader context of device mobility (e.g., in 4G/5G/LTE networks, IoT and LLN networks that use 802.15.4, etc.).

Specifically, according to one or more embodiments of the disclosure as described in detail below, a service maintains a mobility path graph that represents roaming transitions between wireless access points in a network by one or more client devices in the network. The service identifies, using the mobility path graph, one of the wireless access points in the network to which a particular client device is predicted to roam. The service performs, in advance of the particular client device initiating roaming to the one or more wireless access points, one or more roaming handshakes on behalf of the particular client device and with respect to the wireless access point to which the particular client device is predicted to roam. The service sends handshake data from the performed one or more roaming handshakes to the identified access point to which the particular client device is predicted to roam.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 5:
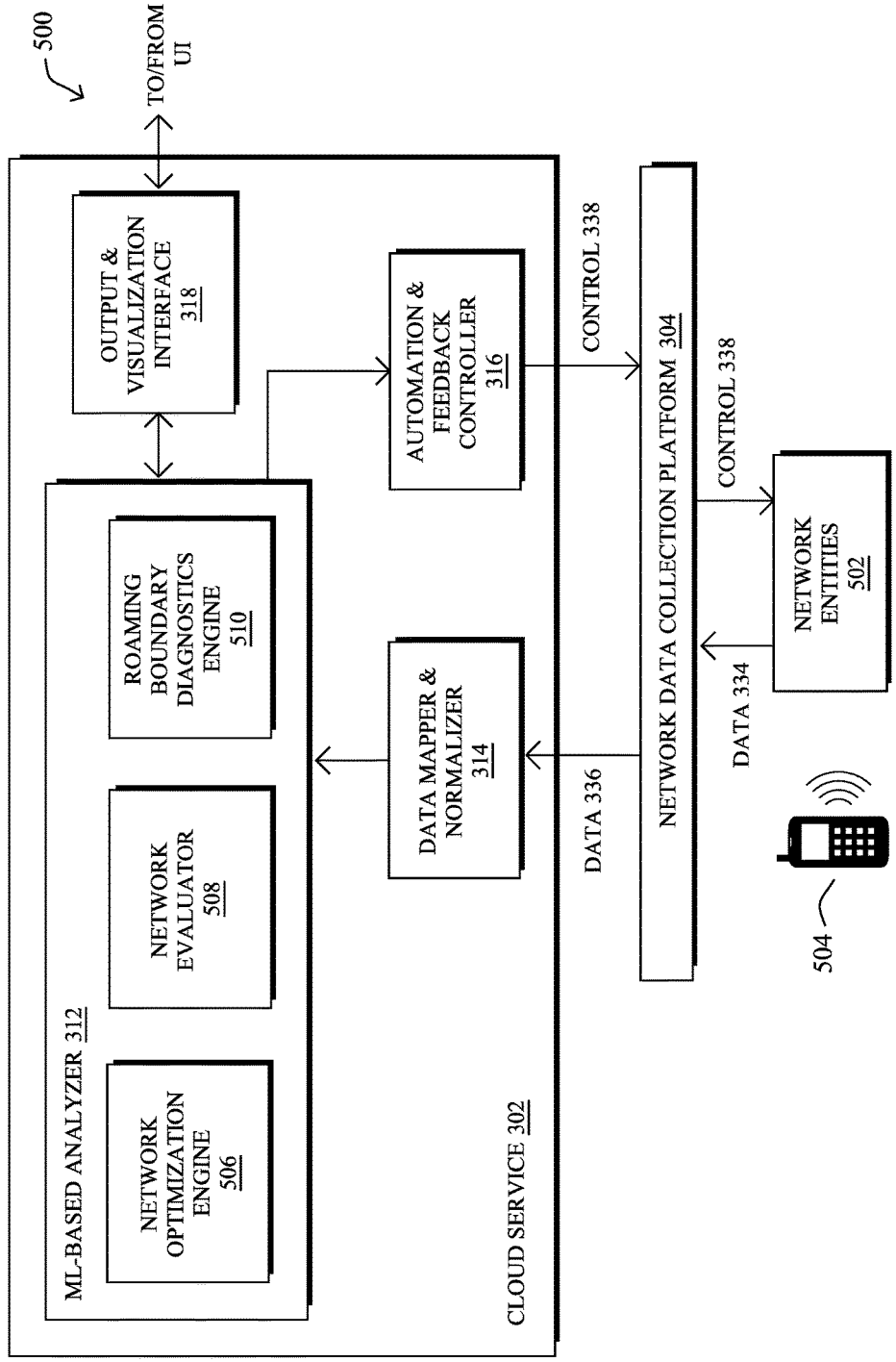
FIG. 5 illustrates an example architecture for performing proactive roaming handshakes.

Operationally, FIG. 5 illustrates an example architecture 500 for performing proactive roaming handshakes in a wireless network based on mobility graphs, according to various embodiments. At the core of architecture 500 may be the following components: a roaming delay analyzer 506, a proactive handshake initiator 508, and/or a proactive reroute trigger 510. In some implementations, the components of architecture 500 may be implemented within a network assurance system, such as system 300 shown in FIG. 3. Accordingly, the components 506-510 of architecture 500 shown may be implemented as part of cloud service 302, as part of network data collection platform 304, and/or on one or more network elements/entities within the monitored network itself. For example, components 506-510 may be implemented as part of machine learning-based analyzer 312, in some embodiments, as shown. Further, these components may be implemented in a distributed manner or implemented as its own stand-alone service, either as part of the local network under observation or as a remote service. In addition, the functionalities of the components of architecture 500 may be combined, omitted, or implemented as part of other processes, as desired.

During operation, a client device 504 may leverage one or more of network entities 502, to communicate wirelessly with the local network. For example, network entities 502 may include wireless APs, WLC, switches, routers, or the like, that provide network connectivity to client device 504. In turn, network entities 502 may report information regarding the roaming and other wireless conditions associated with client device 504 to network data collection platform 304 as part of data 334. Network data collection platform 304 may then pass this data on to cloud service 302 for analysis by ML-based analyzer 312.

Roaming delay analyzer 506 may be configured to compute and store roaming metrics for different client mobility paths observed in the network, according to various embodiments. In contrast with a data plane path, a mobility path generally refers to the list of APs that a client device visits/attaches to in a given period. As would be appreciated, an access point may be a Wi-Fi AP, a gateway in the context of the IoT, a base station, or any other networking device that communicates wirelessly with a client device and provides the client device access to the wireless network. In addition, in various embodiments, roaming delay analyzer 502 may be located in cloud service 302 but, alternatively, may be implemented as a service at the WLC or AP level, as well.

FIGS. 6A-6E illustrate examples of a mobility path in a network, according to various embodiments. In some cases, a given mobility path may be defined as an ordered set of three or more AP nodes. In other words, a mobility path is a control plane path that is not followed by the data, but by the client device itself (e.g., as a result of physical movement of the client device from AP to AP).

In FIG. 6A, assume that a client device 602 is a mobile device that is traveling along a path of travel 606. As would be appreciated, while path of travel 606 is depicted as a linear path, the movement of a mobile device in most situations will not be linear and may vary in one, two, or even three dimensions. For purposes of illustration, assume that the local network comprises APs 604, such as APs 604a-604c (e.g., APs A-C), as shown. At time $T=t_0$, client device 602 may be connected to the wireless network via AP 604a, which may be the closest AP 604 to client device 602 at this time or, alternatively, offer the best characteristics in terms of signal strength, SNR, etc.

In FIG. 6B, assume now that client device 602 has moved along path of travel 606 and is now closer to AP 604b at time $T=t_1$. If the wireless characteristics of AP 604b, from the standpoint of client device 602, are now better than that of AP 604a, client device 602 may initiate roaming. As a result, client device 602 may attach itself to AP 604b and detach itself from AP 604a, thereby completing the roaming operation. After attaching to AP 604b, client device 602 may continue to communicate with the network as normal via AP 604b.

In FIG. 6C, client device 602 may perform a similar operation as in FIG. 6C, but with AP 604c. Notably, assume now that at time $T=t_2$, client device 602 is now within closest proximity to AP 604c and/or that AP 604c offers the best characteristics, from the perspective of client device 602. In such a case, client device 602 may initiate another roaming operation, thereby switching its access from AP 604b to AP 604c.

FIG. 6D illustrates the concept of a mobility path 608, according to various embodiments. Based on the movement and wireless roaming operations of client device 602 over time (e.g., between times $T=t_0$ and $T=t_2$), as depicted in FIG. 6A-6C, client device 602 can be viewed as having traversed mobility path 608. More specifically, mobility path 608 may be a directed (or directionless) set of nodes/APs 604 through which the client device 602 roamed in the network. In this sense, roaming events between the APs 604 can be viewed akin to hops between nodes in a communication data path.

Figure 6E:
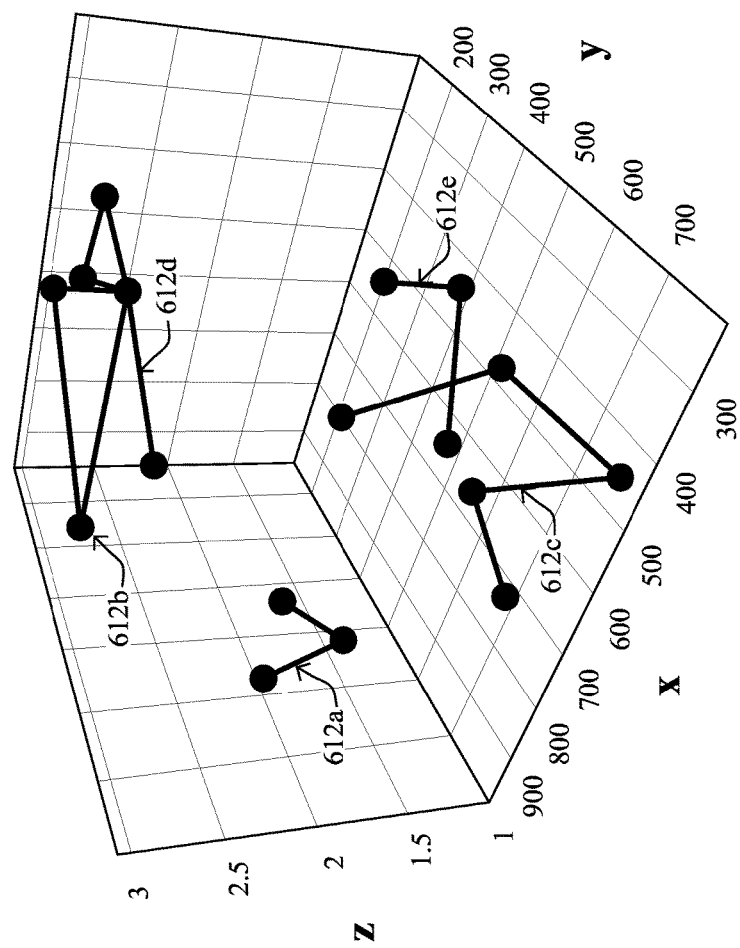

Mobility paths can also be represented in three dimensions, as shown in FIG. 6E. Notably, plot 610 illustrates in three dimensions the mobility paths 612a-612e observed during testing of a wireless network. In some cases, such as with mobility path 612b and 612d, the client devices may tend to stay at the same z-coordinate, indicating that the client device is likely to roam along a mobility path on a single floor. However, such as in the case of mobility path 612e, the client device may roam between APs with different z-coordinates, indicating that the user of the device may have traveled to a different floor.

Referring again to FIG. 5, roaming delay analyzer 506 may use the roaming data collected from the monitored network, to construct a roaming delay graph for the wireless network. In one embodiment, roaming delay analyzer 506 may use machine learning to first compute the most traveled mobility paths in the network and construct a mobility path graph (e.g., a model of the movement of the client device(s) in the network). A node in the constructed graph may represent an AP with edges of the graph representing roaming events from one AP to another. In turn, roaming delay analyzer 506 may associate the collected metrics regarding roaming delays with the represented mobility paths in the graph (e.g., by associating the metrics with the edges of the graph), thereby forming a roaming delay graph for the wireless network. In various embodiments, roaming delay analyzer 506 may generate a mobility path graph per user, per client device, or as an aggregate of captured data regarding any number users or client devices.

For each edge of a mobility path graph, roaming delay analyzer 506 may associate any or all of the following metrics: type of roaming, time for different stages of the roaming event (e.g., authentication, DHCP, etc.), and handshake specific parameters (e.g., Radius Server IP, DHCP Server IP, etc.). This information can be stored based on time-of-day, client type, or even for individual client devices. In other words, roaming delay analyzer 506 may compute the roaming delay metrics for different mobility paths of the user or client. Further, each metric may be expressed using any number of different statistics (e.g., min, max, median, $90^{th}$ percentile, an upper bound computed using a statistical estimate, etc.).

Figure 7A:
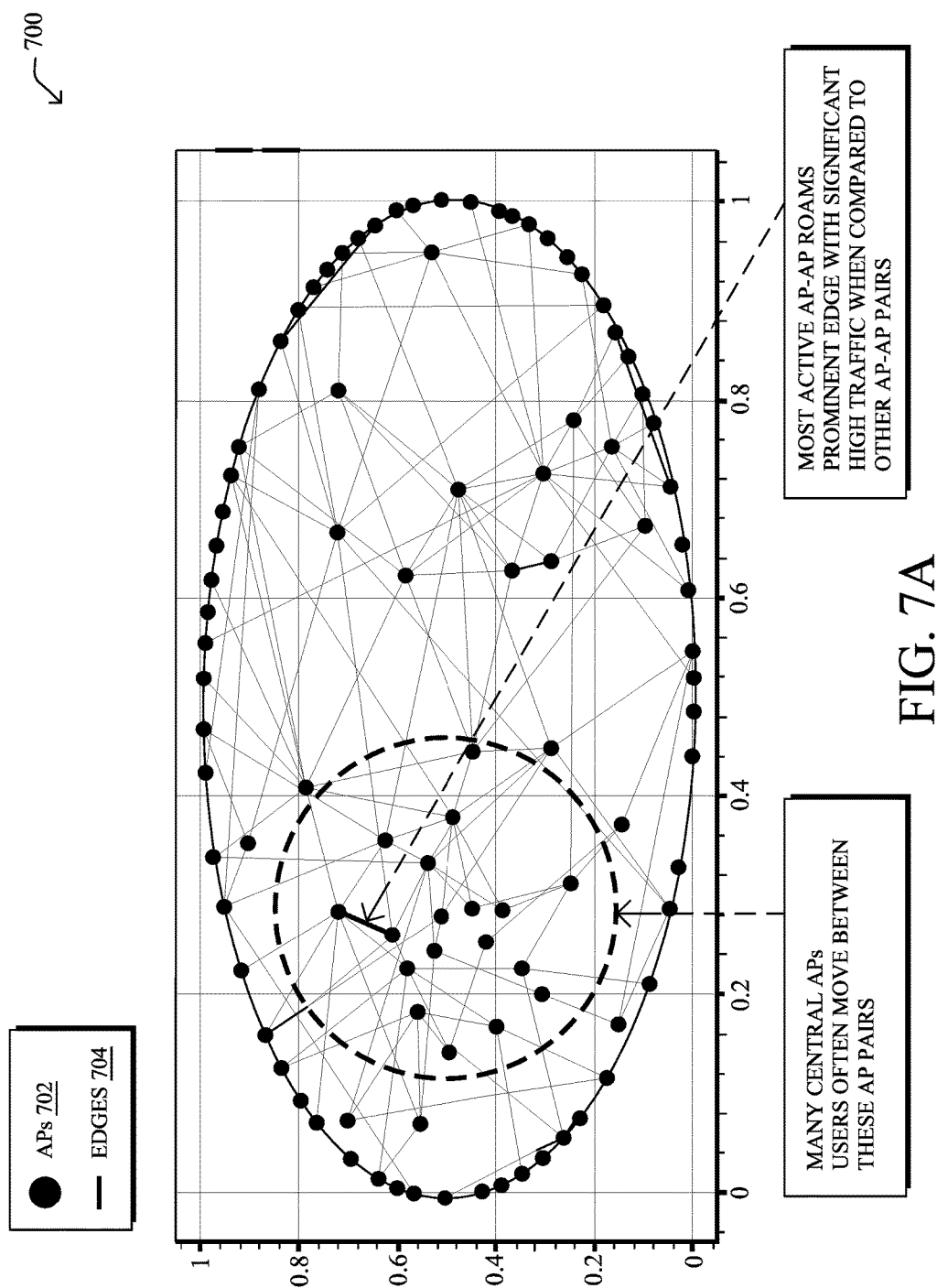
FIGS. 7A-7B illustrate examples of using a path mobility graph to assess metrics regarding roaming delays.
Figure 7B:
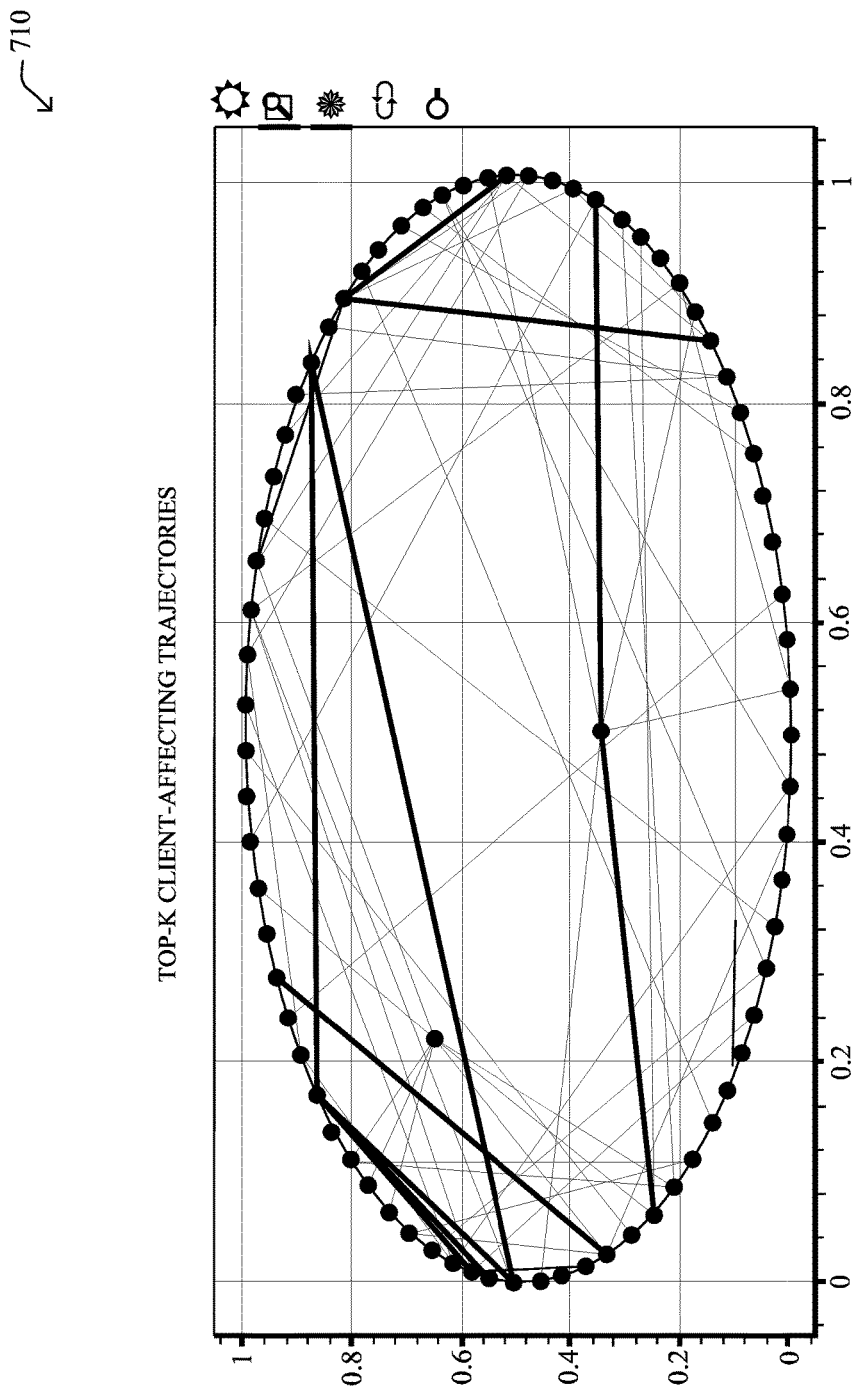

FIGS. 7A-7B illustrate examples of using a path mobility graph to assess metrics regarding roaming delays, according to various embodiments. As shown in graph 700 in FIG. 7A, each AP in the network may be represented as a node 702 with edges 704 representing observed roaming events between APs in the network. In particular, graph 700 was constructed using actual data from a live network during prototyping of the techniques herein. In some cases, the size of a node 702 and/or an edge 704 may represent the volume of attached client devices or roaming events observed. From this, inferences can be made from graph 700, such as that there is a set of central APs through which users typically roam and that roaming events between certain pairs of APs are much more prevalent than others.

Associated with each edge 704 may be any number of metrics regarding roaming delays. For example, as shown in FIG. 7B, the top k-number of client affecting trajectories can be identified from graph 700 based on the metrics associated with edges 704. Notably, metrics associated with an edge 704 may include the type of roaming (e.g., L2 roaming, etc.), authentication delay metrics (e.g., min, max, percentiles, standard deviations, etc.), DHCP delay metrics (e.g., min, max, percentiles, standard deviations, etc.), or the like. These metrics can then be used to optimize the network by assessing changes to the roaming boundaries in the network. For example, to improve the user experience, high use edges that exhibit poor roaming metrics could be converted to use Intra-WLC roaming instead of L2-roaming, drastically reducing the roaming delays between the corresponding APs.

Referring again to FIG. 5, another component of architecture 500 may be proactive handshake initiator 508, in various embodiments. Generally, proactive handshake initiator 508 may perform any or all of three separate tasks. First, proactive handshake initiator 508 may use the mobility path graph(s) maintained by roaming delay analyzer 506 to identify one or more APs or WLCs to which a client device is predicted to roam, as well as the time at which the client device is predicted to initiate the roaming. In some cases, proactive handshake initiator 508 may also determine a measure of confidence in these predictions (e.g., by selecting the AP with the highest confidence measure as the AP the client device is most likely to visit next).

Second, proactive handshake initiator 508 may predict the roaming handshake(s) that the client device will perform when the client device reaches its next predicted AP. For example, proactive handshake initiator 508 may determine that the next AP will be a foreign AP, and the client device will have to anchor to a home AP.

Third, proactive handshake initiator 508 may proactively initiate the respective roaming handshakes needed before the client device can complete its roaming to the predicted next AP. For example, proactive handshake initiator 508 may proactively communicate with a Remote Authentication Dial-In User Service (RADIUS) server, to authenticate and authorize the client device in advance of the client device initiating roaming to the next AP. Similarly, if an IP address is needed by the client device as part of the roaming process, proactive handshake initiator 508 may initiate a DHCP request with a DHCP server for an IP address on behalf of the client device. All these reservations may be marked as "proactive," and, hence, may only reserve these resources and keep this information ready for when the client device moves within range of the new AP. In some cases, none of the resulting handshake data may be transferred to the new AP until the client device actually arrives within range of the new AP and initiates roaming.

Figure 8:
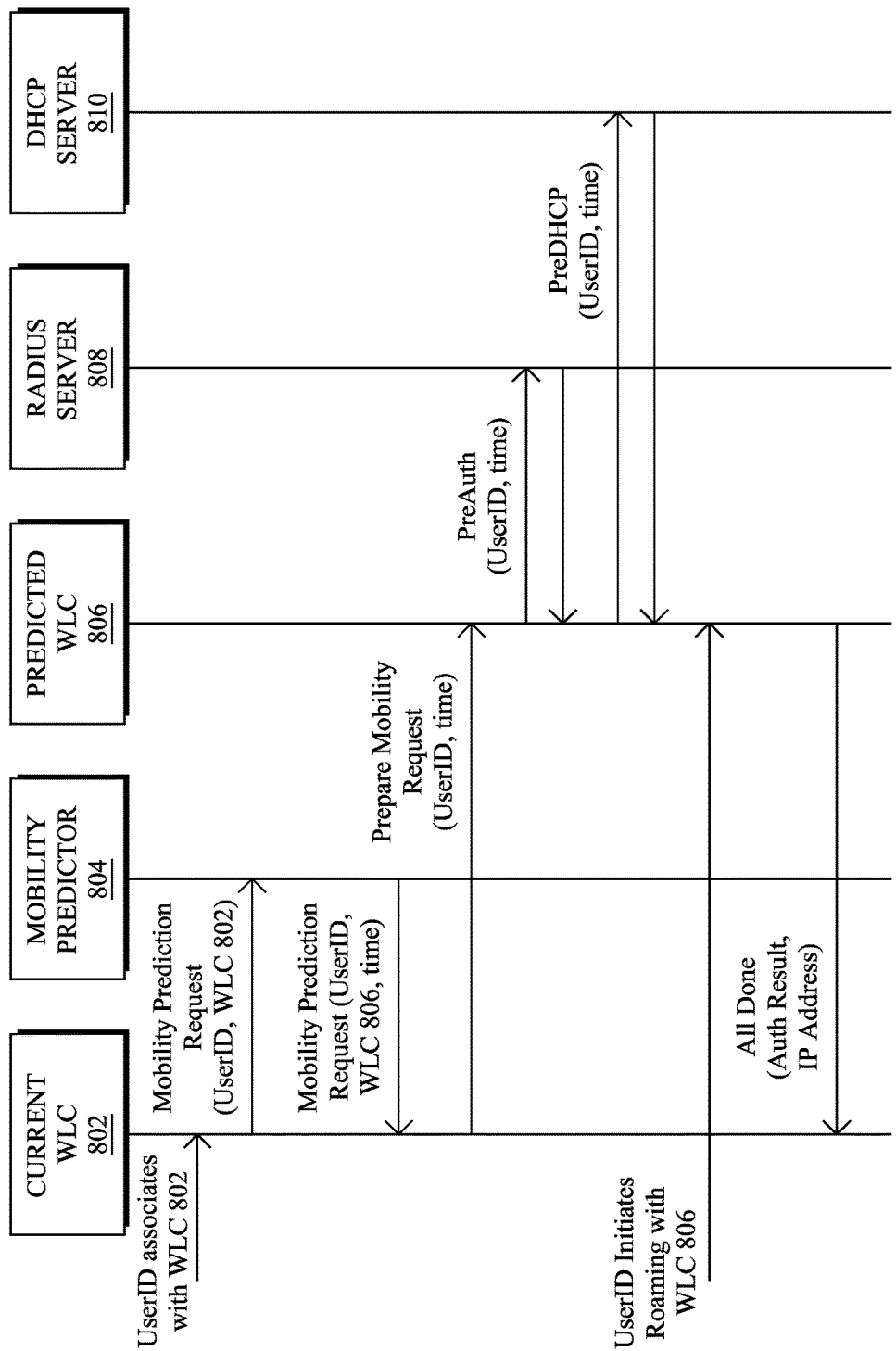
FIG. 8 illustrates an example diagram of the performance of proactive handshakes in a wireless network.

FIG. 8 illustrates an example diagram of the performance of proactive handshakes in a wireless network, according to various embodiments. As shown, assume that a client device attaches to a first AP serviced by a WLC 802 in part by sending a UserID with an association request to WLC 802. Alternatively, or in addition thereto, a device identifier may be used in place of the UserID. If the client device is authorized and allowed to attach to the AP serviced by WLC 802, WLC 802 may then send a mobility prediction request to a mobility predictor 804 (e.g., cloud service 302 hosting any or all of components 506-510, local services/functions of WLC 802, or the like). Such a request may, for example, include both the UserID, device ID, or other information regarding the client device, as well as an identifier for WLC 802 as the current WLC to which the client device is associated.

In response to receiving a mobility prediction request from WLC 802, mobility predictor 804 may respond with a mobility prediction for the client device. Notably, based on the mobility path graph(s) for the network, mobility predictor 804 may predict that the client device is likely to next roam to an AP serviced by WLC 806, as well as a time at which client device is predicted to do so.

Several prediction schemes are possible, to predict the next AP and/or WLC to which the client device is likely to roam. In one embodiment, mobility predictor 804 may simply assess the previous movement patterns of the client device or user associated with the client device. In another embodiment, the prediction may be based on the movement of an entire population of users or client devices. In a further embodiment, the prediction may be based on only portion of the entire population of users or client devices, such as only those that are similar to the particular user or client device under analysis. For example, this similarity can be based on information such as the role of the user in the organization, similarities between the movement pattern of the client device and other client devices, or the like.

In various cases, mobility predictor 804 may also consider only the next predicted AP hop for the client device or, alternatively, the next n-number of hops for the client device. In the case of mobility predictor 804 predicting multiple hops, mobility predictor 804 may use the prediction confidence measures to initiate the proactive roaming handshake(s) for the most likely n-number of next hops for the client device.

Another parameter that mobility predictor 804 may consider is the type of roaming that the client device is predicted to initiate. For example, assume that there are two probable next hops for the client device, AP1 and AP2, with similar confidence measures (e.g., the client device is equally likely to hop to either of the APs). In addition, assume that the client device roaming to AP2 would trigger a Layer-3 type of roaming, which is more costly. In such a case, mobility predictor 804 only triggering the proactive handshake on AP1, and potentially trigger a second handshake on a third probable next hop, AP3.

In various embodiments, WLC 802 may use the mobility prediction from mobility predictor 804 to proactively initiate the roaming handshake(s) on behalf of the client device and in advance of the client device roaming to the AP serviced by WLC 806. For example, WLC 802 may send a request to WLC 806 to prepare for the arrival of the client device, in advance of the client device initiating roaming with one of the APs controlled by WLC 806.

As shown, WLC 806 may perform an authentication handshake by sending an authentication request to a RADIUS server 808 in the network. Such a request may identify, for example, the user (e.g., UserID) of the client device, the client device itself, and/or the time at which the client device is predicted to roam to the AP controlled by WLC 806. In response, RADIUS server 808 may authenticate and pre-authorize the client device to roam to the AP controlled by WLC 806.

In some embodiments, another roaming handshake that WLC 806 may perform on behalf of the client device is a DHCP handshake with DHCP server 810. For example, WLC 806 may request an IP address from DHCP server 810 for the client device, when the client device roams to the AP controlled by WLC 806. Like the authorization request to RADIUS server 808, the DHCP request sent to DHCP server 810 may also indicate the time at which the client device is expected to need the IP address, thereby allowing DHCP server 810 to reserve IP address assignments for different client devices in the future.

Based on the proactive roaming handshake(s) performed by WLC 806, WLC 806 is now ready to complete the roaming operation when the client device actually roams to the AP controlled by WLC 806. Thus, when the user/client device initiates the roaming operation, WLC 806 can quickly complete the roaming operation and, in some cases, notify the previous WLC 802 that the roaming operation has completed.

Referring again to architecture 500 in FIG. 5, another function of the reservation scheme enacted by proactive handshake initiator 508 may be to handle prediction failures when the user/client device does not arrive at the predicted AP. Such failures can be handled by canceling the reservation. In one embodiment, the AP may reserve the resources, such as IP address from a DHCP server, or the like, for a given time period. This reservation time period can be based on the time at which the client device is predicted to initiate roaming to the AP. For example, if the user/client device is expected to arrive at AP-X at time t, but fails to arrive even after t+n seconds, then the reservation may be cancelled at the AP and the DHCP server. In another embodiment, the resources may be annulled if the client device attaches to a different AP than the predicted AP. In such cases, resources may also be transferred to the new AP (e.g., an IP address already reserved can be transferred from the predicted AP to the actual AP, etc.), thereby reducing the roaming times even when the client device does not arrive at the predicted AP.

In various embodiments, architecture 500 may also include a proactive reroute trigger module 510 configured to proactively reroute the client device to another AP if any of the handshakes have failed or are predicted to fail. For example, assume that each AP in the network is constrained to a maximum number of attached client devices or users at any given time. In the client device under analysis is predicted to arrive at AP-X, and is already at or close to the maximum number of clients, then AP-X may signal the WLC that the client device is expected to face a roaming failure if the client device joins the predicted AP-X. In turn, proactive reroute trigger module 510 may cause the WLC to send a notification to the client device, thereby causing the client device to attempt roaming with a different AP in the network. In another example, assume that proactive handshake initiator 508 fails to reserve an IP for a client device on a first DHCP server (e.g., due to exhaustion of the IP pool of the DHCP server). In such a case, proactive reroute trigger module 510 may trigger the sending of a second DHCP request to another DHCP server, to reserve an IP address for the client device.

Figure 9:
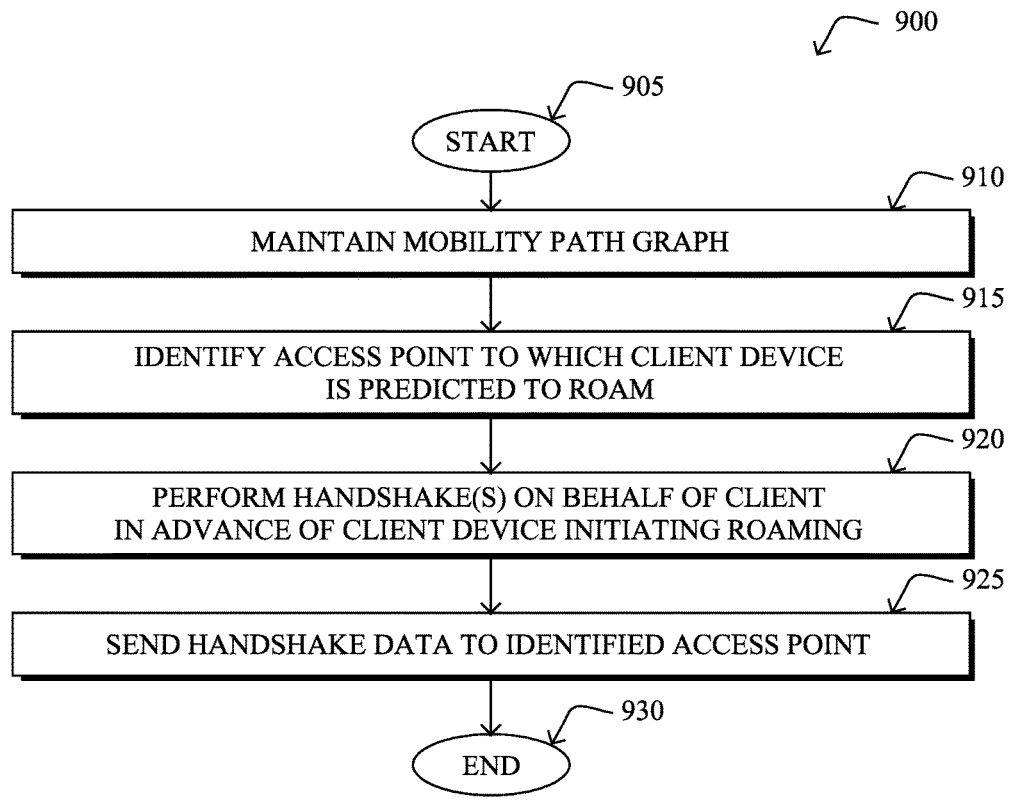
FIG. 9 illustrates an example simplified procedure for performing a proactive roaming handshake based on a mobility graph.

FIG. 9 illustrates an example simplified procedure for performing a proactive roaming handshake based on a mobility graph, in accordance with one or more embodiments described herein. For example, a non-generic, specifically configured device (e.g., device 200) that provides a service in a network may perform procedure 900 by executing stored instructions (e.g., process 248). The procedure 900 may start at step 905, and continues to step 910, where, as described in greater detail above, the service may maintain a mobility path graph that represents roaming transitions between wireless access points in a network by one or more client devices in the network. In some embodiments, such a graph may be for a particular user or client device. In other embodiments, the graph may be for an aggregate of users and/or client devices in the network. In general, a mobility path graph may represent APs as nodes in the graph. Edges between the nodes may then be assigned any number of observed or predicted metrics, such as the volume of client devices that roam between any two APs, metrics regarding the roaming operations (e.g., roaming type, handshake times, etc.), or the like.

At step 915, as detailed above, the service may identify, using the mobility path graph, one of the wireless access points in the network to which a particular client device is predicted to roam. For example, if the client device is currently attached to AP-X, analysis of the mobility path graph by the service may indicate that the client device is most likely to roam to another AP in the network, AP-Y. Thus, in some embodiments, the service may use a machine learning-based model to predict a mobility path of the particular client device, based on previous movements of the particular client device.

At step 920, the service may perform one or more roaming handshakes on behalf of the particular client device and with respect to the wireless access point to which the particular client device is predicted to roam, as described in greater detail above. In various embodiments, the service may do so in advance of the client device initiating roaming with the predicted next AP. In some embodiments, this may entail sending an authentication data on behalf of the particular client device to a RADIUS server. In further embodiments, this may entail sending a DHCP request to a DHCP server on behalf of the particular client device.

At step 925, as detailed above, the service may send handshake data from the performed one or more roaming handshakes to the identified access point to which the particular client device is predicted to roam. For example, when the client device actually attempts to roam to the predicted AP, the service may send authorization data, a new IP, or the like, to the new AP. By proactively performing the handshakes beforehand, the roaming time experienced by the client device may be reduced considerably. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a reduced amount of time needed for a client device to roam between APs in a wireless network. By proactively performing the roaming handshake(s) before a client device arrives at a predicted next AP in the network, the roaming operation can be completed much faster. As detailed herein, such roaming transitions would otherwise impact the user experience in many client applications, such as voice and video conferencing.

While there have been shown and described illustrative embodiments that provide for proactive roaming handshakes in a wireless network, it is to be understood that various other adaptations and modifications may be made within the spirit and scope of the embodiments herein. For example, while certain embodiments are described herein with respect to using certain models for purposes of predicting client device movement and roaming transitions between APs, the models are not limited as such and may be used for other functions, in other embodiments. In addition, while certain protocols are shown, such as DHCP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   maintaining, by a service, a mobility path graph that represents roaming transitions between wireless access points in a network by one or more client devices in the network;
   identifying, by the service and using the mobility path graph, one of the wireless access points in the network to which a particular client device is predicted to roam;
   performing, by the service and in advance of the particular client device initiating roaming to the one or more wireless access points, one or more roaming handshakes on behalf of the particular client device and with respect to the wireless access point to which the particular client device is predicted to roam, wherein performing the one or more roaming handshakes on behalf of the particular client device includes:
      determining, by the service, that a first Dynamic Host Configuration Protocol (DHCP) handshake performed by the service on behalf of the particular client with a first DHCP server has failed; and
      performing, by the service and based on the first DHCP handshake failing, a second DHCP handshake with a second DHCP server on behalf of the particular client; and
   sending, by the service, handshake data from the performed one or more roaming handshakes to the identified access point to which the particular client device is predicted to roam.

2. The method as in claim 1, wherein identifying the wireless access point to which the particular client is predicted to roam comprises:
   using, by the service, a machine learning-based model to predict a mobility path of the particular client device, based on previous movements of the particular client device.

3. The method as in claim 1, wherein identifying the wireless access point to which the particular client is predicted to roam comprises:
   using, by the service, a machine learning-based model to predict a mobility path of the particular client device, based on previous movements of a plurality of client devices in the network.

4. The method as in claim 1, wherein performing the one or more roaming handshakes on behalf of the particular client device and with respect to the wireless access point to which the particular client device is predicted to roam comprises:
  sending, by the service, authentication data on behalf of the particular client device to a Remote Authentication Dial-In User Service (RADIUS) server.

5. The method as in claim 1, wherein performing the one or more roaming handshakes on behalf of the particular client device and with respect to the wireless access point to which the particular client device is predicted to roam comprises:
  sending, by the service, a Dynamic Host Configuration Protocol (DHCP) request to a DHCP server on behalf of the particular client device.

6. The method as in claim 1, further comprising:
  predicting, by the service, that a handshake performed by the service on behalf of the particular client will fail; and
  causing, by the service, the particular client device to roam to a different wireless access point, based on the prediction that the handshake will fail.

7. The method as in claim 6, wherein the handshake is predicted to fail because the wireless access points in the network to which the particular client device is predicted to roam has reached a maximum number of admitted client devices.

8. The method as in claim 1, wherein the first DHCP handshake failed because a pool Internet Protocol (IP) addresses of the first DHCP server was exhausted.

9. An apparatus comprising:
  one or more network interfaces to communicate with a network;
  a processor coupled to the network interfaces and configured to execute one or more processes; and
  a memory configured to store a process executable by the processor, the process when executed configured to:
    maintain a mobility path graph that represents roaming transitions between wireless access points in a network by one or more client devices in the network;
    identify, using the mobility path graph, one of the wireless access points in the network to which a particular client device is predicted to roam;
    perform, in advance of the particular client device initiating roaming to the one or more wireless access points, one or more roaming handshakes on behalf of the particular client device and with respect to the wireless access point to which the particular client device is predicted to roam, wherein the apparatus performs the one or more roaming handshakes on behalf of the particular client device by:
      determining that a first Dynamic Host Configuration Protocol (DHCP) handshake performed by the service on behalf of the particular client with a first DHCP server has failed; and
      performing, based on the first DHCP handshake failing, a second DHCP handshake with a second DHCP server on behalf of the particular client; and
    send handshake data from the performed one or more roaming handshakes to the identified access point to which the particular client device is predicted to roam.

10. The apparatus as in claim 9, wherein the apparatus identifies the wireless access point to which the particular client is predicted to roam by:
  using a machine learning-based model to predict a mobility path of the particular client device, based on previous movements of the particular client device.

11. The apparatus as in claim 9, wherein the apparatus identifies the wireless access point to which the particular client is predicted to roam by:
  using a machine learning-based model to predict a mobility path of the particular client device, based on previous movements of a plurality of client devices in the network.

12. The apparatus as in claim 9, wherein the apparatus performs the one or more roaming handshakes on behalf of the particular client device and with respect to the wireless access point to which the particular client device is predicted to roam by:
  sending authentication data on behalf of the particular client device to a Remote Authentication Dial-In User Service (RADIUS) server.

13. The apparatus as in claim 11, wherein the apparatus performs the one or more roaming handshakes on behalf of the particular client device and with respect to the wireless access point to which the particular client device is predicted to roam by:
  sending a Dynamic Host Configuration Protocol (DHCP) request to a DHCP server on behalf of the particular client device.

14. The apparatus as in claim 9, wherein the process when executed is further configured to:
  predict that a handshake performed by the apparatus on behalf of the particular client will fail; and
  cause the particular client device to roam to a different wireless access point, based on the prediction that the handshake will fail.

15. The apparatus as in claim 14, wherein the handshake is predicted to fail because the wireless access points in the network to which the particular client device is predicted to roam has reached a maximum number of admitted client devices.

16. The apparatus as in claim 9, wherein the first DHCP handshake failed because a pool Internet Protocol (IP) addresses of the first DHCP server was exhausted.

17. The apparatus as in claim 9, wherein the apparatus comprises a wireless access point or wireless local area network controller (WLC) to which the particular client device is associated.

18. A tangible, non-transitory, computer-readable medium storing program instructions that cause a device to execute a process comprising:
  maintaining a mobility path graph that represents roaming transitions between wireless access points in a network by one or more client devices in the network;
  identifying, using the mobility path graph, one of the wireless access points in the network to which a particular client device is predicted to roam;
  performing, in advance of the particular client device initiating roaming to the one or more wireless access points, one or more roaming handshakes on behalf of the particular client device and with respect to the wireless access point to which the particular client device is predicted to roam wherein performing the one or more roaming handshakes on behalf of the particular client device includes:
    determining that a first Dynamic Host Configuration Protocol (DHCP) handshake performed by the service on behalf of the particular client with a first DHCP server has failed; and performing, based on the first DHCP handshake failing, a second DHCP handshake with a second DHCP server on behalf of the particular client; and sending handshake data from the performed one or more roaming handshakes to the identified access point to which the particular client device is predicted to roam.

* * * * *